United States Patent [19]

Fujimoto et al.

[11] 4,404,952

[45] Sep. 20, 1983

[54] MAGNET IGNITION DEVICE

[75] Inventors: Takanori Fujimoto; Yasuo Tada, both of Himeji, Japan

[73] Assignee: Mitsubishi Denki Kabushiki Kaisha, Tokyo, Japan

[21] Appl. No.: 332,206

[22] Filed: Dec. 18, 1981

Related U.S. Application Data

[63] Continuation of Ser. No. 95,521, Nov. 19, 1979.

[30] Foreign Application Priority Data

Dec. 19, 1978 [JP] Japan ................ 53-157268

[51] Int. Cl.³ .................................... F02P 5/08
[52] U.S. Cl. .................... 123/602; 123/418; 123/618; 123/648; 315/219
[58] Field of Search .............. 123/596, 599, 602, 605, 123/612, 615, 629, 618, 418, 414; 315/209 SC, 209 CD

[56] References Cited

U.S. PATENT DOCUMENTS

| | | |
|---|---|---|
| 3,890,944 | 6/1975 | Werner et al. |
| 3,898,972 | 8/1975 | Haubner ................ 123/602 |
| 3,901,201 | 8/1975 | Mizuguchi et al. ......... 123/415 |
| 4,088,106 | 5/1978 | Borst et al. .............. 123/418 |
| 4,099,507 | 7/1978 | Pagel et al. ............. 123/418 |
| 4,175,509 | 11/1979 | Orova et al. ............. 123/418 |
| 4,201,163 | 5/1980 | Hattori et al. ........... 123/418 |
| 4,228,778 | 10/1980 | Rabus et al. ............ 123/640 |

FOREIGN PATENT DOCUMENTS

| | | | |
|---|---|---|---|
| 1472343 | 3/1967 | France ............... | 315/209 SC |
| 49-92430 | 3/1974 | Japan . | |
| 55-153926 | 12/1979 | Japan ............... | 123/618 |

Primary Examiner—Parshotam S. Lall
Attorney, Agent, or Firm—Oblon, Fisher, Spivak, McClelland & Maier

[57] ABSTRACT

A magnet ignition device is provided with an angular position detecting device for producing a first angular signal with one polarity corresponding to an angular position of a given crankshaft of an engine and a second angular signal with the other polarity corresponding to an angular position of the crankshaft retarded by a given angle relative to the angular position where the first angular signal is generated. An ignition timing operation circuit is driven by the first angular signal. A signal representing advance angle information of the result of the operation by the operation circuit and the second angular signal are both applied to a switching element. In the circuit arrangement, only the second angular signal is used as an ignition signal in low rotational frequencies suffering from a great variation of the rotational frequency of the engine and, in high rotational frequencies higher than a given rotational frequency, only the advance angle signal is used as the ignition signal. With such an arrangement, an instability of the ignition timing due to a great variation of the rotational frequency in low rotational frequencies is prevented thereby to secure an accurate and stable ignition timing.

2 Claims, 11 Drawing Figures

NOTE: SIGNALS a AND b ARE SHOWN IN FIGS. 2, 5 & 9

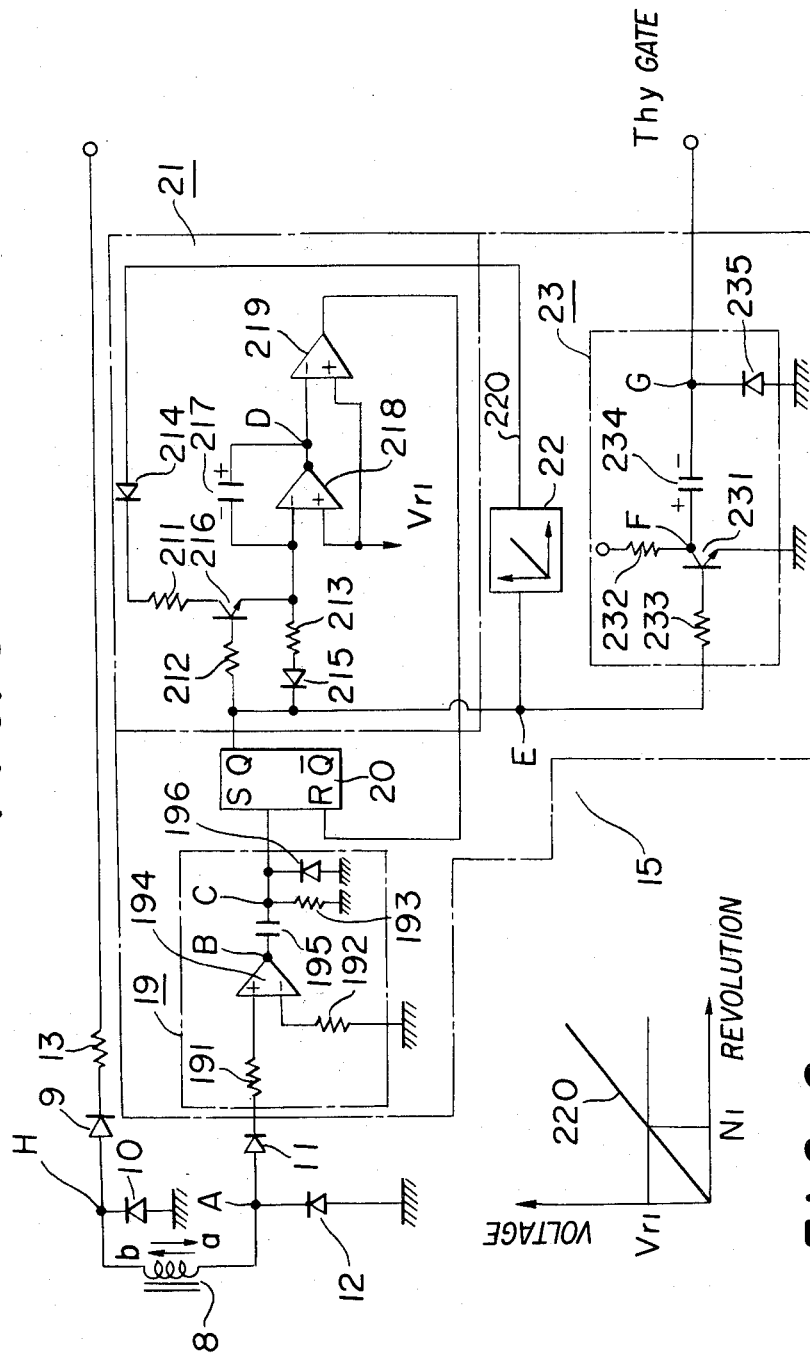

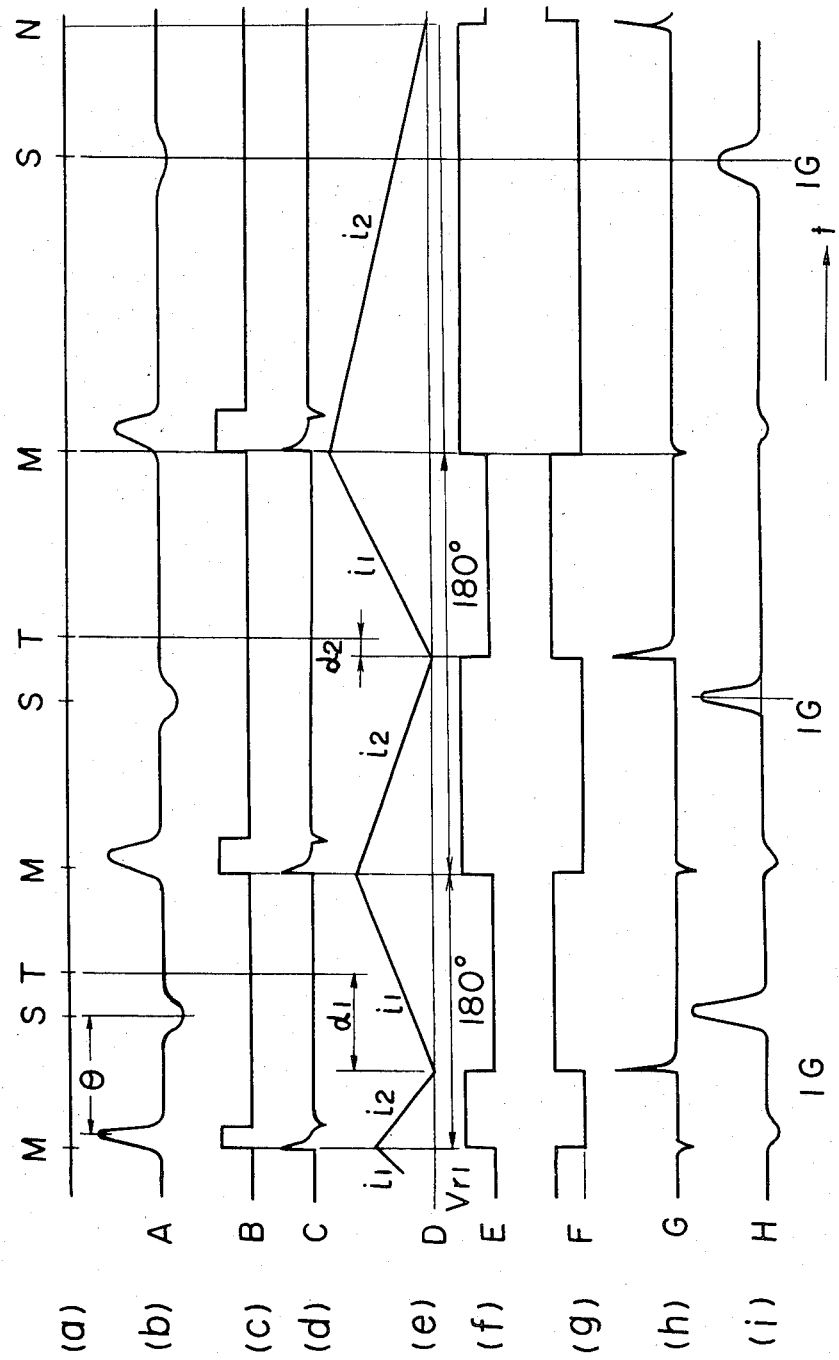

MAGNET IGNITION DEVICE

This is a continuation of application Ser. No. 095,521, filed Nov. 19, 1979.

BACKGROUND OF THE INVENTION

The present invention relates to improvements over a magnet ignition device of the electronic type.

A set of timing charts, shown in FIG. 1, illustrating the operation principle of a known ignition device disclosed in Japan published unexamined patent application No. 36234/77 (52 of Showa) well illustrates particularly a case where the rotational frequency of an engine or an angular velocity $\omega$ of the crankshaft is remarkably reduced.

In FIG. 1, M1 and M2 on a time axis (a) represent two different rotational angular positions of the crankshaft; T a top dead point; S a required ignition angular position. Triangle waveforms lying on a time axis (b) show variations of charging and discharging voltages of the capacitor used in the device of the above-mentioned specification. Vref designates a reference voltage for determining the charging start and the discharging termination. The device is so arranged that the capacitor is charged during a period from the position M1 to the position M2 with a current $i_1$ and following the position M2 it is discharged with a current $i_2$, and at the reference voltage Vref an ignition signal is issued. A curve decepted above and along a time axis (c) shown in FIG. 1 generally illustrates a variation of the rotational angular velocity $\omega$ of the engine.

Let us assume that an angle and a lapse of time between the positions M1 and M2 are $\theta_1$ and T1, an angle and a time lapse between positions M2 and S are $\theta_2$ and T2, an angle between positions S and T is $\alpha$, and an angle between the position T and the next position M1 is $\theta_3$. On the assumption, an advance angle $\alpha$ is given by $$\alpha = 180 - (\theta_1 + \theta_2 + \theta_3) \quad (1)$$

In the equation, $\theta_1$ and $\theta_3$ are constant, which are in dependence upon the positions M1 and M2 on the rotational angle axis of the crankshaft, and $\theta_2$ is expressed $$\theta = \bar{\omega}_2 \, T_2 \quad (2)$$

where $\bar{\omega}_2$ is an average angular velocity over time point t2 to t3. Accordingly, the advance angle $\alpha$ may be expressed $$\alpha = K - \bar{\omega}_2 \, T_2 \quad (3)$$

where K is a constant and is given $$K = 180 - \theta_1 - \theta_3 \quad (4)$$

The amounts of the charging and discharging of the capacitor are fixed, so that we have $$i_1 T_1 = i_2 T_2 \quad (5)$$

T1 may also be expressed $$T1 = \theta_1 / \bar{\omega}_1 \quad (6)$$

From the equations (3), (5) and (6), we have $$\alpha = K - i_1/i_2 \times \bar{\omega}_2 / \bar{\omega}_1 \times \theta_1 \quad (7)$$

As seen from the equation (7), if $i_1$ or $i_2$ is changed in accordance with a running condition of the engine, the advance angle changes corresponding to the change of the current.

As described above, if the advance angle $\alpha$ is adjusted on the basis of the equation (7), the ratio $\bar{\omega}_2/\bar{\omega}_1$ is always constant. Let us consider a case where, when a spark is produced at time point t7, for example, it fails to ignite a combustion mixture in the engine cylinder. In this case, the rotational speed of the crankshaft rapidly decreases and a time till the top dead point T and the next angular position M1 are considerably elongated, and further times T1' and T2' substantially corresponding to the ignition preparing period of another stroke following the present one is considerably elongated. As a result, if a ratio of an average angular velocity $\bar{\omega}'_2$ from time point t10 to t11 to an average angular velocity $\bar{\omega}'_1$ from time point t9 to t10, i.e. $\bar{\omega}'_2/\bar{\omega}'_1$, is smaller than the ratio $\bar{\omega}_2/\bar{\omega}_1$ in the preceding stroke, the equation (7) shows that, even if the current ratio $i_1/i_2$ is constant, $\alpha$ grows. As a result, the spark is produced at an angular position S' far advanced relative to the position S for the required ignition time.

As the rotational speed of the engine is lower, a mixing condition of the intake combustion mixture is generally worse, so that the irregular combustion or the ignition failure is apt to occur, and thus a variation of the rotational frequency is great.

To fix the advanced angle $\alpha$ in low rotational frequencies of the engine crankshaft, even if the charging and discharging currents of the capacitor can be kept constant, when the angular velocity $\omega$ greatly changes every cycle as shown in FIG. 1, the ratio $\bar{\omega}_2/\bar{\omega}_1$ changes every moment, so that the actual ignition timing varies relative to the required ignition time S. A stable and accurate ignition timing is never obtained.

SUMMARY OF THE INVENTION

With a view of overcoming the disadvantages, the invention provides a magnet ignition device with a good performance.

The invention provides a magnet ignition device operable with a stable and accurate ignition timing, with the following construction.

The magnet ignition device is provided with an angular position detecting device for producing a first angular signal with one polarity corresponding to an angular position of a given crankshaft of an engine and a second angular signal with the other polarity corresponding to an angular position of the crankshaft retarded by a given angle relative to an angular position where the first angular signal is produced. An ignition timing circuit also included in the ignition device is driven by the first angular signal. A signal representing advance angle information of the result of the operation by the operation circuit and the second angular signal are both applied to a switching element. In the circuit arrangement, only the second signal is used as an ignition signal in low rotational frequencies suffering from a great and irregular variation of the rotationary frequency of the engine and, in high rotational frequencies higher than a given rotational frequency, only the advance angle signal is used as the ignition signal. With such an arrangement, an instability of the ignition timing due to a great variation of the rotational frequency in low rotational frequencies is prevented.

Another object of the invention is to provide an improved magnet ignition device with a simple circuit construction in which the advance angle signal and the second angular signal are both applied to a switching element for controlling the ignition and only the earlier signal of those effects the ignition, thereby eliminating the use of a circuit to select either of the advanced angle signal and the second angular signal.

BRIEF DESCRIPTION OF THE DRAWINGS

FIG. 5 shows a circuit diagram illustrating the detail of the embodiment of FIG. 2;

FIG. 6 shows a graph illustrating an output characteristic of an F-V circuit shown in FIG. 5;

FIG. 7 shows a set of timing diagrams useful in explaining the operation of the embodiment shown in FIG. 2;

DETAILED DESCRIPTION OF THE PREFERRED EMBODIMENTS

Figure 2:
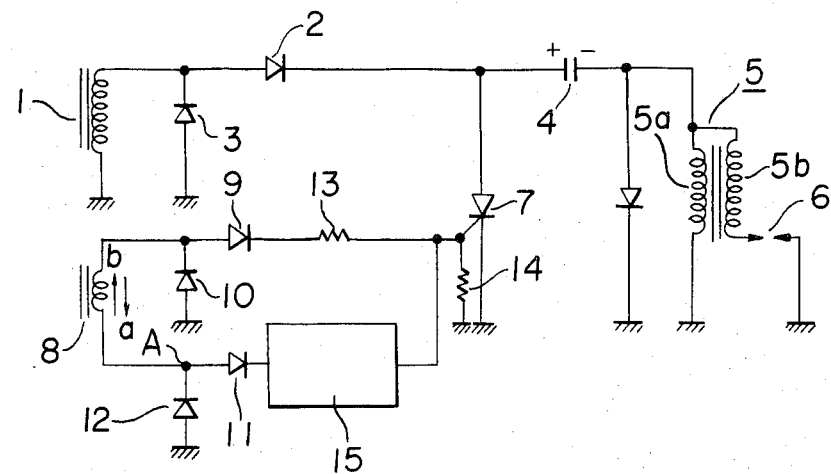
FIG. 2 shows a circuit diagram of an embodiment of a magnet ignition device according to the invention.

Referring now to the drawings and particularly to FIGS. 2 to 8, there is shown an embodiment of a magnet ignition device according to the invention. In FIG. 2, reference numeral 1 designates a generator coil of a magnet (not shown) of a power source which produces an AC voltage alternately changing between positive and negative polarities in synchronism with a rotation of an engine. Reference numerals 2 and 3 designate diodes for rectifying an output signal of the generator coil; 4 a capacitor charged by the output signal of the generator 1 after rectified by the diode 2; 5 an ignition coil connected to a discharge circuit of the capacitor 4 having a primary coil 5a connected in series with the capacitor 4 and a secondary coil 5b connected to an ignition plug 6; 7 a thyristor of a switching element provided in the discharge circuit of the capacitor 4, which permits a charge stored in the capacitor 4 to be discharged into the primary coil 5a. A signal coil 8 for generating an ignition signal, as an angular position detector, produces a first angular signal a corresponding to a given angular position of the engine crankshaft in synchronism with a rotation of the engine and a second angular signal b corresponding to an angular position of the crankshaft delayed by $\theta$ from the angular position where the angular signal a is produced. At a point A shown in FIG. 2, the output signal a is positive in polarity and the output signal b is negative. Upon receipt of either the signal a or the signal b, the thyristor 7 is conductive. In the circuit, reference numerals 9 to 12 are diodes for preventing backward flow of current; 13 and 14 resistors connected to the gate of the thryistor 7; 15 an ignition timing operation circuit which starts its operation in response to the first angular signal a to perform the operation of the ignition timing in accordance with a running condition of the engine. The circuit 15 is illustrated in detail in FIG. 5.

Figure 3:
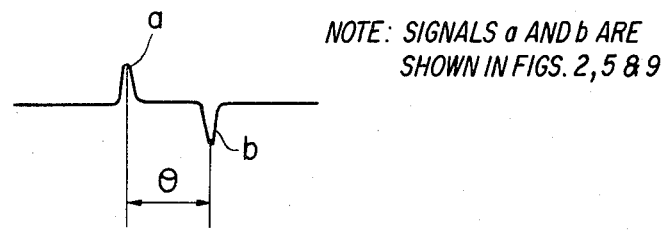
FIG. 3 shows waveforms of angular signals developed by a signal coil used in the circuit shown in FIG. 2.
Figure 4:
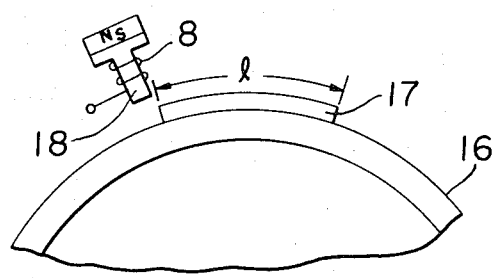
FIG. 4 shows a front view of a structure of an angular position detecting device used in the embodiment shown in FIG. 2.

In FIG. 4 schematically illustrating a structure of the angular position detector, a flywheel 16 of a magnet generator, which is shaped tubularly, has a permanent magnet (not shown) attached onto the inner peripheral surface thereof. Reference numeral 17 designates an iron plate fixed to the outer periphery of the flywheel and with a given length l extending in its peripheral direction. Actually, two iron plates 17 are provided on the periphery of the flywheel 16. Reference numeral 18 is representative of a stator core axially disposed facing the iron plate 17 with a clearance intervening there between. The stator core 18 is wound therearound by the signal coil 8. With the rotation of the flywheel 16, it goes up to any away from the rotating iron plates 17, so that a signal voltage as shown in FIG. 3 is produced in the signal coil 8.

Turning now to FIG. 5, there is shown a circuit diagram of the ignition timing operation circuit 15. In the circuit, numeral 19 denotes a wave shaper for waveshaping an output signal from the signal coil 8; 191 to 193 resistors; 194 a voltage comparator (referred to as a comparator); 195 a capacitor; 196 a diode; 20 a flip-flop circuit; 21 an operation circuit connected to the flip-flop circuit to produce a given output signal in accordance with the number of rotation of the engine; 211 to 213 resistors; 214 and 215 diodes; 216 a transistor; 217 a capacitor; 218 an operational amplifier (referred to as an opeamp); 219 a voltage comparator (referred to as a comparator); 22 a rotational-frequency to voltage converting circuit (referred to as an F-V circuit) which receives the output signal a of the signal 8 wave-shaped as a rotational-frequency signal and produces a DC voltage proportional to the number of revolution.

The flip-flop circuit 20 is connected at one input terminal S to the wave shaping circuit 19 and at the other input terminal R to the output of the comparator 219. One of the output terminals denoted as Q, is connected to the base of the transistor 216 by way of a resistor 212 and to the emitter of the transistor 216 through a series circuit including a diode 215 and a resistor 213. The transistor 216 is connected at the collector to the output terminal of the F-V circuit 22 through the resistor 211 and the diode 214 and at the emitter to the inverted input terminal (referred to as a (−) terminal) of the opeamp. The output terminal of the opeamp 218 is connected to the (−) terminal of the comparator 219 and to the (−) terminal of the opeamp per se by way of the capacitor 217. The non-inverted input terminal (+) of each of the opeamp 218 and the comparator 219 is biased by a comparing voltage Vr1. In the circuit, reference numeral 23 denotes a pulse trailing-edge detecting circuit which detects a given output pulse in accordance with the result of the operation by the operation circuit 21 to deliver an output signal to the gate of the thyristor 7. A transistor 231 is connected at the base to one of the output terminals, denoted as Q, of the flip-flop circuit 20 via the resistor 231 and at the collector to a power source via the resistor 232, and at the emitter to ground. Further, reference numeral 234 represents a capacitor connecting to the collector of the transistor 231 and numeral 235 is a diode for discharge. In FIG. 6 graphically illustrating an output characteristic of the F-V circuit 22, a straight line 220 represents an example of the characteristic, changing linearly. As shown in FIG. 6, the characteristic is obtained with a bias voltage Vr1 of the comparator 219 for the rotational frequency N1.

Figure 1:
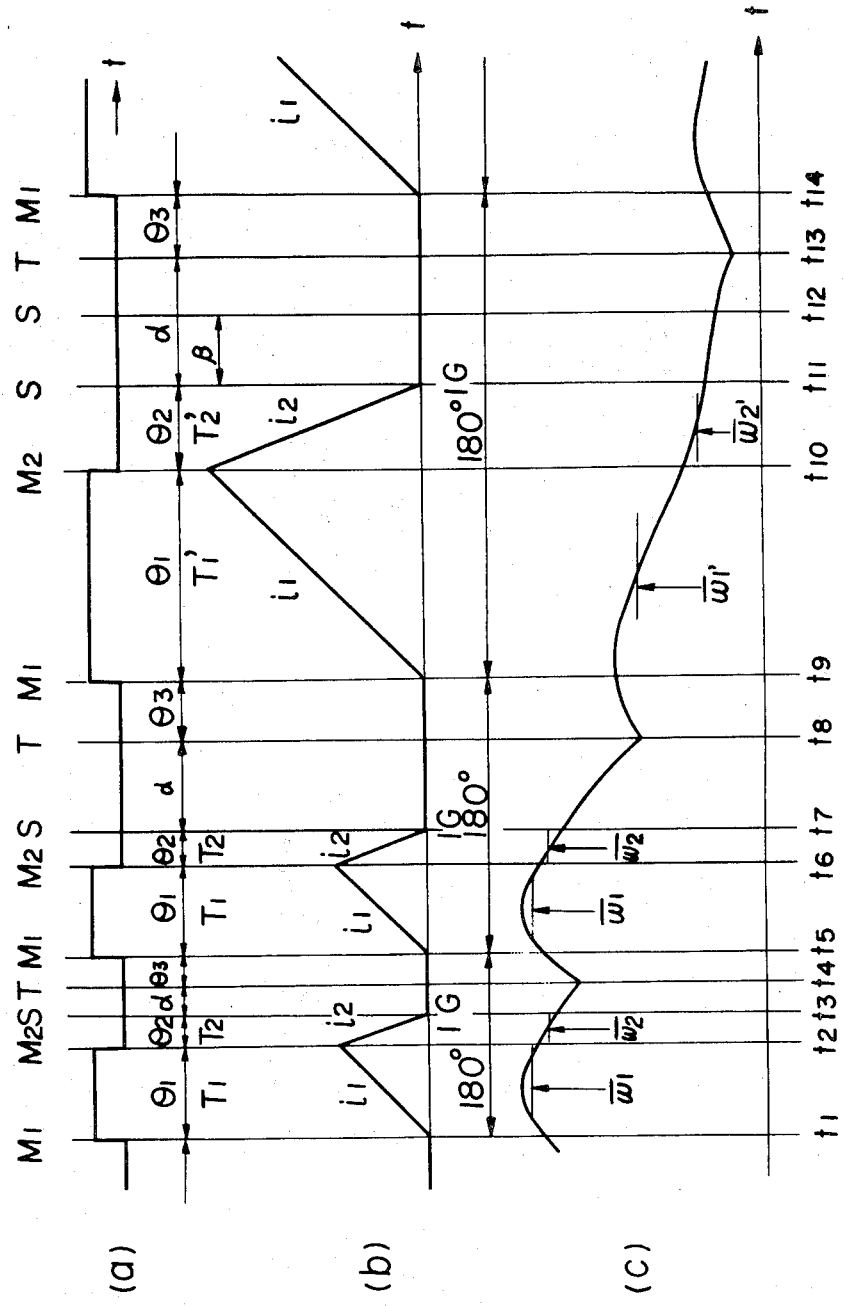
FIG. 1 shows a set of timing diagrams useful in explaining the operation of a conventional ignition device.

In FIG. 7, time lines (b) to (i) arrange therealong time charts of voltages A to H at the respective portions in FIG. 5; a time line (a) a time chart with symbols representing angular positions of the crankshaft arranged thereon; M an angular position slightly leading the most advanced angular position required by the engine; S an ignition position required at a low speed; T a top dead point as in FIG. 1. With revolution of the engine, the output voltage A is high at the position M and low at the position S, as shown in FIG. 7.

The explanation to follow is for the operation of the embodiment thus constructed. In the magnet ignition device of the CDI type shown in FIG. 2, the rectified output signal from the power source coil 1 charges the capacitor 4 with the polarities as shown in the figure. A charge stored in the capacitor is applied to the primary coil 5a of the ignition coil 5 at a time that the ignition timing operation circuit 15 with the output voltage a of the signal coil 8 as its input signal produces an output signal or at a time that the output voltage b of the signal coil 8 is produced, upon the conduction of the thyristor 7, thereby causing a high voltage in the secondary coil 5b and the ignition plug 6 to produce a spark.

The adjusting means of the conduction timing of the thyristor 7, or the ignition timing, will be described in detail, together with a phase-advance characteristic curve shown in FIG. 8.

Figure 8:
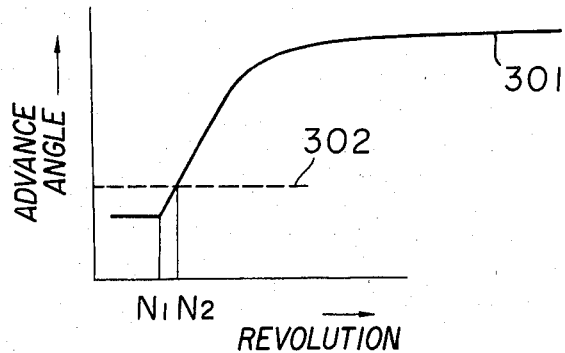
FIG. 8 shows a graph illustrating an advance angle characteristic useful in explaining the operation of the embodiment shown in FIG. 2.

Let it be assumed that the engine runs at a fixed rotational frequency higher than that N2 shown in FIG. 8 and the spark advance angle at that time is not zero and leads by angle α from a position T. On this assumption, the ignition device shown in FIG. 2 and FIG. 5 will operate in the following manner.

The F-V circuit 22 counts or integrates an output voltage corresponding to a rotational frequency of the engine to produce an output voltage 220 higher than a bias voltage Vr1. The output voltage 220 is applied to the collector of the transistor 216 as its collector supply voltage.

The flip-flop circuit 20 is set by a high level of the output voltage C at the position M to produce the output voltage E at a high level. When the output voltage E becomes a high level, the transistor 216 is forwardly biased through the resistor 212 to be turned on. Upon turning on the transistor 216, the capacitor 217 charged with the polarities as shown in FIG. 5 starts to discharge with a current $i_2$ given by the following equation.

$i_2$ = ((F-V output voltage 220)—Vr1—voltage drop across diode 214)/resistance of resistor 211+high level output voltage of flip-flop—Vr1—voltage drop across B-E path of transistor 216)/resistance of resistor 212     (8)

As seen from the above equation, a magnitude of the discharge current $i_2$ depends on the output voltage 220 of the F-V circuit 22, if the bias voltage Vr1 and the resistances of the resistors 211 and 212 are constant. Upon commencing of the discharge of the capacitor 217, the output voltage D of the opeamp 218 descends as shown in FIG. 7 to reach the bias voltage Vr1, so that a positive pulse voltage appears at the output of the comparator 219. The positive pulse voltage becomes a reset input signal of the flip-flop 20.

When the flip-flop circuit 20 receives the reset pulse at the input terminal R, it is reset to produce the output voltage E of a low level.

The time width of the output voltage E of a high level thus obtained corresponds to the result of the operation by the operation circuit 21.

When the output voltage E of the flip-flop circuit 20 reaches a high level, a base current is fed to the transistor 231 of the pulse trailing edge detecting circuit 23, via the resistor 233, so that the transistor 231 is turned on. With this, the capacitor 234 charged with the polarities as shown in discharged through the transistor 231 and the diode 235, so that the output voltage F becomes low in level and an output voltage corresponding to a voltage drop across the diode 235 appears at point G. Then, when the output voltage E of the flip-flop circuit 20 descends from a high level to a low level, no base current is applied to the transistor 231 and therefore the transistor 231 is turned off. As a result, the capacitor 234 is charged with the polarities as shown, by way of the resistor 232. Accordingly, the power source terminal voltage F becomes high in level and a large trigger voltage as shown in FIG. 7 appears at point G, which in turn is applied the gate of the thyristor 7.

In this manner, the output voltage E of the flip-flop circuit 20 becomes low in level. In turn, the transistor 216 is cut-off. The cut-off of the transistor 216 removes the application of the output voltage 220 of the F-V circuit 22 to the interval input terminal (−) of the opeamp 218, so that the output voltage D of the opeamp 218 ascends. Upon the ascending of the output voltage D, charging the capacitor 217 in the polarity direction with the current $i_1$ expressed by the following relation, commences.

$i_1$ = (Vr1 —voltage drop across diode 215)/resistance of resistor 213     (9)

As seen from the above equation, an amplitude of the charging current $i_1$ is constant irrespective of the rotational frequency. Accordingly, the charging voltage across the capacitor 217, i.e. the output voltage D of the opeamp 218 takes a waveform with a linear inclination independently of the rotational frequency as shown in FIG. 7.

When the output voltage B becomes again high in level at the angular position M in the rotational frequency area lower than the rotational frequency N2 but higher N1 shown in FIG. 8, the flip-flop circuit 20 is set as mentioned above, the capacitor 217 discharges, and the output voltage E of the operation circuit 21 becomes high in level. However, the output voltage 220 of F-V circuit 22 is lower than that in the previous cycle and thus the discharge current 12 is small, as seen from the equation (8). Accordingly, a longer time than that in the previous cycle is taken until the voltage across the capacitor 217, or the output voltage D of the opeamp 218 reaches a bias voltage Vr1, so that the output voltage having reached the bias voltage Vr1 becomes low in level at a position retarded relative to a required ignition position S, or a position advanced by α2 relative to the top dead point T. When the output voltage E of the flip-flop circuit 20 becomes low in level, the output voltage F becomes high in level. At an angular position some angle after the set position S, the output voltage G is applied to the gate of the thyristor 7 as a trigger pulse, as shown in FIG. 7.

This position becomes a position advanced by α2 relative to the top dead point T.

In a rotational frequency region including rotational frequencies lower than that N1 shown in FIG. 8, when the output voltage B becomes again high in level at the position M, the flip-flop circuit 20 is set and the capacitor 217 is discharged. At this time, the output voltage 220 is lower than the bias voltage Vr1, as seen from FIG. 6. Therefore, even if the transistor 216 is turned on, the output voltage 220 of the F-V circuit 22 doesn't affect the discharge current $i_2$ which is given by the following equation $$i_2 = ((\text{output voltage E of a high level of flip-flop}) - \text{Vr1} - \text{voltage drop across B-E path of transistor 216})/\text{resistance of resistor 212} \quad (10)$$

The above equation shows that, in this region, a magnitude of the discharge current $i_2$ is constant irrespective of the rotational frequency and that the charging current $i_1$ is constant independent of the rotational frequency. Accordingly, an angular position where the output voltage E of the flip-flop circuit 20 becomes low in level, that is to say, an angular position of the trigger pulse where the output voltage E is applied to the gate of the thyristor 7, is always advanced by a fixed angle from the top dead point T.

In the operation as mentioned above, when only the output signal of the ignition timing operation circuit 15 is applied to the gate of the thyristor 7, an advanced angle characteristic obtained is as indicated by a continuous line denoted as 301 in FIG. 8. When only the output signal b of the signal coil 8 is applied to the gate of the thyristor 7, an advanced angle characteristic as indicated by a broken line 302 in FIG. 8 is obtained. Here, if an output voltage H dependent on the output signal b of the signal coil 8 and an output voltage G operated on the basis of the output signal a of the signal coil 8 are continuously applied to the gate of the thyristor 7, a charge stored in the capacitor 4 is applied to the primary coil 5a for ignition depending on which signal of those G and H applied to the gate of the thyristor 7 is earlier applied under the angular relations shown in FIGS. 7 and 8, and then a high voltage is induced in the secondary ignition coil 5b to cause the ignition plug 6 to spark. Therefore, even if the retarded signal (signal G or H) reaches the gate of the thyristor 7 after the earlier one and then the thyristor 7 is turned on, no high voltage is induced in the ignition coil 5 since the capacitor 4 has fully discharged already. In other words, in higher rotational frequencies than N2, the ignition starts at an angular position advancing by α1 relative to the top dead point T, while in lower rotational frequencies than N2, the ignition starts at a point S shown in FIG. 7.

Let us consider a case where, in the above-mentioned operation, after the ignition coil 6 is sparked at position S, the engine fails to ignite a combustion mixture by some cause.

Such a failure of ignition is apt to occur in low rotational frequencies and is caused by a variation of the mixture ratio of the mixture. In the ignition failure, the rotational angular frequency of crank rapidly decreases to remarkably elongate a time taken until it reaches the next position M. Since charging current $i_1$ to the capacitor 217 is constant as seen from the equation (9), the charging voltage D, i.e. the output voltage D of the opeamp 218 is high, compared to that of the previous cycle, however. In this way, the output voltage B becomes high in level at position M after the ignition failure. At this time, the flip-flop circuit 20 is set as in the previous cycle and the capacitor 217 becomes in a discharge condition. Under this condition, the discharge of the capacitor 217 progresses with a discharge current $i_2$. With the discharge, the output voltage D reaches the bias voltage Vr1 at a the position α2 advancing relative to the top dead point T. At this point, the output voltage E drops to low level. At this time, however, the output voltage F becomes high, so that the output voltage G grows to be a large pulse to render the thyristor 7 conductive. Earlier than the generation of the trigger pulse, the output b of the signal coil 8 is supplied to the gate of the thyristor 7 to permit a charge stored in the capacitor 4 to be applied to the ignition coil 5. As result, an ignition voltage is produced in the secondary coil 5b to cause the ignition plug 6 to spark. Therefore, if the trigger pulse is applied to the thyristor 7, no ignition voltage is produced in the ignition coil since no charge is stored in the capacitor 4 at this time, so that no spark is produced by the ignition plug 6.

As described above, when the engine runs at higher rotational frequencies than N2, the combustion mixture is ignited on the basis of the result of the operation by the operation circuit 21 receiving the output voltage a from the signal coil 8, that is to say, at the trailing edge of the output voltage E. The ignition time IG is advanced relative to at least the angular position S with the advanced angle of zero required by the engine. When the rotational frequency of the engine shaft becomes lower than N2, and some cause provides the ignition failure, if it is desired to keep the running of the engine, the output signal b, which is the retarded signal of those from the signal coil 8, not the operation result of the operation circuit 21, is used to effect the ignition to have the advanced angle characteristic as shown in FIG. 8.

In summary, in the low speed region of the engine where the variation of the rotational frequency or the angular velocity of the crankshaft of the engine is great for each cycle, the ignition is performed by using a mechanically fixed signal in an extremely simple manner, not the electrically processed signal.

Figure 9:
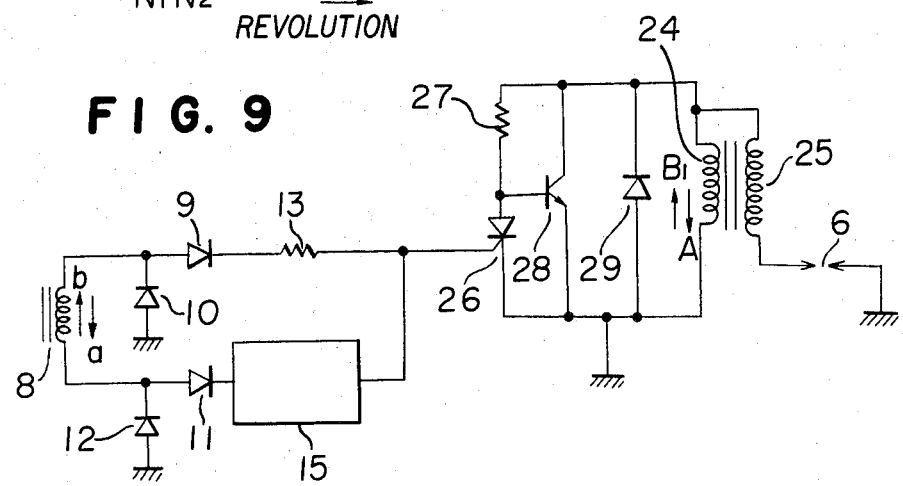
FIG. 9 shows a circuit diagram of the ignition device which is the second embodiment according to the invention.

In addition to the magnet ignition device of the CDI type mentioned above, the invention is applicable for a magnet ignition device of the current shut-off type as shown in FIG. 9.

In FIG. 9, reference numeral 24 designates a power source coil used also as the ignition primary coil. Numeral 25 represents the ignition secondary coil. A thyristor 26 is connected in series with the power source coil via the resistor 27 and is connected at the gate to both output terminals of the signal coil 8. A transistor 28 is connected at the base to anode between the resistor 27 and the anode of the thyristor 26, at the collector to one end of the power source coil 24, and at the emitter to one end of the power source coil 24, and at emitter to the other end of the power source coil A diode 29 is connected at the anode to one and of the power source coil 24 and at the anode to the other end of the power source coil 24.

In this example, the output signal in a B1 direction of the power source coil 24 causes a base current to flow into the transistor 28 via the resistor 27, so that the transistor 28 is conductive and a large current flows through the power source coil. Then, at the ignition time of the engine, the operated signal of the output signal a from the signal coil 8 and the output signal b are applied to the thyristor 26, thereby to render the thyristor 26 conductive. With this, the passage current of the power source coil 24 abruptly reduces. As a result of the abrupt change, a high voltage is induced in the ignition secondary coil, so that the ignition plug 6 is sparked. On the other hand, the output signal in the direction A is short circuited by the diode 29 and therefore it does not contribute to the ignition.

Figure 10:
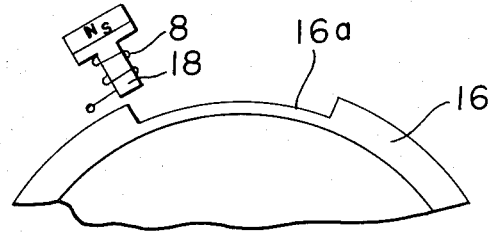
FIGS. 10 and 11 show front views of other embodiments of the invention.
Figure 11:
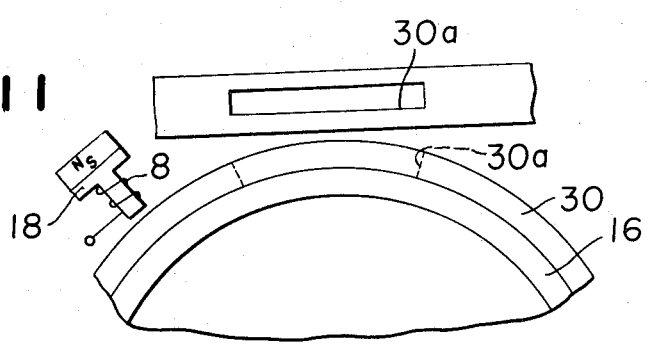

In this embodiment, when the rotational frequency of the crankshaft is higher than N2, the output signal a of the signal coil 8 is earlier applied to the thyristor 26 to effect the ignition while, when it is lower than N2, the output b is earlier applied to the thyristor, as in the first embodiment. Further, in either high or low speed, the conduction signals are continuously applied to the thyristor 26. However, the first signal applied reduces the passage current of the power source coil 24, so that, even if the later signal is applied to the thyristor 26, the passage current in the power source coil 24 does not change, so that no ignition voltage is produced in the secondary ignition coil 25. The device for causing the signal coil 8 to produce an angular signal employed in the above-mentioned embodiments has the iron plates 17 mounted onto the periphery of the flywheel 16 as shown in FIG. 4. Some alternations are allowable in the invention, however. In an example shown in FIG. 10, a cut-away portion 16a is formed on the periphery of the flywheel 16. In another example shown in FIG. 11, a ring 30 is fitted around the outputer periphery of the flywheel 16 and a cut-away portion 30a as a magnetic modulating portion is formed on the periphery of the ring 30. The same effects as those obtained by the above-mentioned embodiments also are attainable when those alternations are used. In place of two magnetic modulating portions such as iron plates 17 attached onto the outer periphery of the flywheel 16, a single magnetic modulating portion may also be used.

As described above, the magnet igniton device according to the invention is provided with an angular position detecting device for producing a first angular signal with one polarity corresponding to an angular position of a given crankshaft of an engine and a second angular signal with the other polarity corresponding to an angular position of the crankshaft retarded by a given angle relative to the angular position where the first angular signal is generated. An ignition timing operation circuit is driven by the first angular signal. A signal representing advanced angle information of the result of the operation by the operation circuit and the second angular signal are both applied to a switching element. In the circuit arrangement, only the second signal is used as an ignition signal in low frequencies suffering from a great variation of the rotational frequency of the engine and, in high frequencies higher than a given rotational frequency, only the advanced angle signal is used as the ignition signal. With such an arrangement, an instability of the ignition timing due to a great variation and irregular of the rotational frequency in low rotational frequencies is as found in the conventional device is completely eliminated to secure an accurate and stable ignition timing. Further, the advanced angle signal and the second angular signal are both applied to the switching element for controlling the ignition and only the earlier signal effects the ignition. For this, no circuit to select either the advanced angle signal or the second angular signal is needed, thus leading a simple circuit construction.

What is claimed is:

1. A magnet ignition device comprising: power source means for producing a positive and negative output in synchronism with the rotation of an engine and capable of making the output rectified pass through an ignition coil; a switching element for controlling the passage of current to the ignition coil; an angular position detecting means for producing a first angular signal with one polarity corresponding to an angular position of a given crankshaft of the engine and a second angular signal with the other polarity corresponding to an angular position of the crankshaft retarded by a given angle relative to the angular position where the first angular signal is produced, in synchronism with the rotation of the engine; and an ignition timing operation circuit which produces an operational signal in response to the first angular signal and comprises an integration circuit which defers the timing of production of an operational signal fed to the switching element in accordance with the speed of the engine, wherein the second angular signal and the operational signal are each applied to the switching element such that for each engine revolution the firstly produced of said second angular signal and said operational signal produces switching of said switching element to produce passage of current to the ignition coil, such that when the rotational frequency is higher than a given rotational frequency of the engine, the operational signal is used to initiate ignition as a function of engine speed while, when it is lower than the given rotational frequency, the second angular signal is used to initiate at a predetermined angle of engine rotation.

2. A magnet ignition device according to claim 1, in which said angular position detecting means is a single unit, said first angular signal is a positive or a negative signal, and said second angular signal is a negative or a positive signal delayed by a given angle from a position where said first angular signal is produced.

* * * * *